US008721142B2

(12) United States Patent
Lambert et al.

(10) Patent No.: US 8,721,142 B2
(45) Date of Patent: May 13, 2014

(54) FOG LAMP AND THE LIKE EMPLOYING SEMICONDUCTOR LIGHT SOURCES

(71) Applicant: Magna International Inc., Aurora (CA)

(72) Inventors: Chad D. Lambert, Belleville (CA); James R. McFadden, Oxford, MI (US); Ronald O. Woodward, Yorktown, VA (US); Ronald G. Hare, Ontario (CA)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 13/789,139

(22) Filed: Mar. 7, 2013

(65) Prior Publication Data

US 2013/0250598 A1 Sep. 26, 2013

Related U.S. Application Data

(63) Continuation of application No. 12/934,389, filed as application No. PCT/CA2009/000408 on Mar. 26, 2009, now abandoned.

(60) Provisional application No. 61/070,920, filed on Mar. 26, 2008.

(51) Int. Cl.
*F21V 3/00* (2006.01)
*B60Q 1/00* (2006.01)

(52) U.S. Cl.
USPC ........... 362/511; 362/509; 362/545; 362/547; 362/294; 362/373

(58) Field of Classification Search
USPC ......... 362/511, 506, 507, 540, 541, 542, 545, 362/547, 240, 518, 520, 522, 294, 296.05, 362/296.07, 311.02, 311.06, 311.09, 311.1, 362/327, 329, 335, 347, 349, 373, 509; 257/98, 99
See application file for complete search history.

(56) References Cited

U.S. PATENT DOCUMENTS

| | | | |
|---|---|---|---|
| 3,911,430 | A | 10/1975 | Jankowski et al. |
| 5,555,161 | A | 9/1996 | Roe et al. |
| 6,048,083 | A | 4/2000 | McDermott |
| 6,637,921 | B2 | 10/2003 | Coushaine |
| 6,749,320 | B1 | 6/2004 | Hartley |
| 6,976,770 | B2 | 12/2005 | Trimpe et al. |
| 7,131,759 | B2 | 11/2006 | Ishida et al. |
| 7,144,121 | B2 | 12/2006 | Minano et al. |
| 7,290,906 | B2 | 11/2007 | Suzuki et al. |
| 7,316,495 | B2 | 1/2008 | Watanabe et al. |
| 7,329,033 | B2 | 2/2008 | Glovatsky et al. |
| 7,560,742 | B2 | 7/2009 | Wilson |

(Continued)

FOREIGN PATENT DOCUMENTS

| | | |
|---|---|---|
| DE | 10062103 | 7/2002 |
| EP | 0678699 | 10/1999 |

(Continued)

*Primary Examiner* — Thomas Sember

(74) *Attorney, Agent, or Firm* — Harness, Dickey & Pierce, PLC

(57) ABSTRACT

A novel vehicular light fixture (10) is disclosed. The light fixture (10) is compact, yet efficient, and employs semiconductor light sources (44) to produce output light in desired patterns. The fixture (10) can be used to produce fog lamps, driving lamps and other non-headlamp vehicle lighting functions. Depending upon the light output required, one or more semiconductor light sources (44) and a corresponding number of optical bodies (64) are employed in the fixture (10) to produce the desired light pattern.

20 Claims, 2 Drawing Sheets

(56) References Cited

U.S. PATENT DOCUMENTS

| | | | |
|---|---|---|---|
| 7,588,359 | B2 | 9/2009 | Couchaine et al. |
| 2002/0079506 | A1 | 6/2002 | Komoto et al. |
| 2002/0145871 | A1 | 10/2002 | Yoda |
| 2003/0058641 | A1 | 3/2003 | Watanabe et al. |
| 2004/0008952 | A1 | 1/2004 | Kragl |
| 2004/0080938 | A1 | 4/2004 | Holman et al. |
| 2004/0149998 | A1 | 8/2004 | Henson et al. |
| 2004/0218392 | A1 | 11/2004 | Leadford |
| 2004/0263346 | A1 | 12/2004 | Neal |
| 2005/0018446 | A1 | 1/2005 | Ishida |
| 2005/0116635 | A1 | 6/2005 | Watson et al. |
| 2007/0041207 | A1 | 2/2007 | Ishida |
| 2007/0120137 | A1 | 5/2007 | Wilson et al. |
| 2007/0127258 | A1 | 6/2007 | Wang et al. |
| 2007/0139946 | A1 | 6/2007 | Basile et al. |
| 2009/0003009 | A1 | 1/2009 | Tessnow et al. |
| 2009/0213606 | A1 | 8/2009 | Coushaine et al. |
| 2010/0084667 | A1 | 4/2010 | McFadden |
| 2011/0096562 | A1 | 4/2011 | Lambert |

FOREIGN PATENT DOCUMENTS

| | | |
|---|---|---|
| EP | 1213178 | 6/2002 |
| EP | 1923263 | 5/2008 |
| FR | 2797678 | 2/2001 |
| FR | 2855866 | 12/2004 |
| WO | WO2007062277 | 5/2007 |
| WO | WO2008089560 | 7/2008 |

14
10
20
42

40
32
34
30
24
38
48
28
24
26
44
22
12
18

FOG LAMP AND THE LIKE EMPLOYING SEMICONDUCTOR LIGHT SOURCES

CROSS-REFERENCE TO RELATED APPLICATIONS

This application is a continuation of U.S. Ser. No. 12/934,389 filed Dec. 14, 2010 which is a National Stage of International Application No. PCT/CA2009/000408 filed Mar. 26, 2009 which claims benefit of U.S. Patent Application No. 61/070,920 filed on Mar. 26, 2008. The entire disclosures of the above applications are incorporated herein by reference.

FIELD OF THE INVENTION

The present invention relates to a fog lamp, or the like, for vehicle lighting systems. More specifically, the present invention relates to a fog lamp, or the like, which employs semiconductor light sources.

BACKGROUND OF THE INVENTION

Light emitting semiconductors, such as high output light emitting diodes (LEDs), can now produce white light at sufficient levels so that semiconductor light sources can be used instead of incandescent or gas discharge lamps to create lighting systems such as vehicular headlamps and signaling lamps.

However, while the creation of such semiconductor-based lighting systems is possible, semiconductor light sources present the lighting system designer with some unique challenges. In particular, the light output of even high output semiconductor light sources is still much less than conventional incandescent and gas discharge lamps. Thus, conventional lighting system designs, intended for such prior art light sources with much higher light output levels, are generally too inefficient at making use of the light emitted from semiconductor light sources.

Further, operating high output semiconductor light sources require effective cooling of their semiconductor junctions to prevent failure of the light source, and the provision of such cooling in a vehicular environment can be challenging.

While much work has been done in the area of vehicular headlamp systems employing high output semiconductor light sources, to date the design of other vehicular lighting systems employing semiconductor light sources has been limited to non-pattern forming signaling lamps (such as brake or turn signals) which employ multiple, low-output, light emitting diodes in substantially conventional light fixtures.

It is instead desired to have a vehicular lighting system which employs semiconductor light sources, such as high output light emitting diodes, to produce desired illumination patterns other than headlamp patterns.

SUMMARY OF THE INVENTION

It is an object of the present invention to provide a novel vehicular light fixture employing semiconductor light sources which obviates or mitigates at least one disadvantage of the prior art.

According to a first aspect of the present invention, there is provided a vehicular lighting fixture for producing light in a desired pattern. The fixture includes a substrate, at least one set of a semiconductor light source, and an optical body. Each semiconductor light source has a light emitting surface and is mounted to the substrate while also being in thermal connection with the substrate.

The optical body includes a light receiving surface and a light output surface. The optical body is mounted to the substrate such that the light receiving surface is located immediately adjacent the light emitting surface of the semiconductor light source. Additionally, the optical body is mounted to the substrate such that the light output surface is located to produce a desired output light pattern from the fixture.

The present invention also includes a base member for mounting the fixture to a vehicle, with the substrate being affixed to the base member and in thermal connection with the base member. There is also set of cooling fins in thermal connection with the base member to remove waste heat from the base member. An electrical circuit board including power regulation circuitry is connected to a set of electrical connectors extending out of the fixture. The electrical circuit board is operable to provide a suitable power supply from the electrical connectors to each of the at least one semiconductor light sources. The present invention also has a lens allowing light output from the light output surface of the optical body to exit the fixture. The lens engages the base member to form a weather proof enclosure with the base member, the enclosure enclosing the substrate, the at least one semiconductor light source and optical body, and the electrical circuit board.

The present invention provides a novel vehicular light fixture. The light fixture is compact, yet efficient, and employs semiconductor light sources to produce output light in desired patterns. The fixture can be used to produce fog lamps, driving lamps and other non-headlamp vehicle lighting functions. Depending upon the light output required, one or more semiconductor light sources and a corresponding number of optical bodies are employed in the fixture to produce the desired light pattern.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
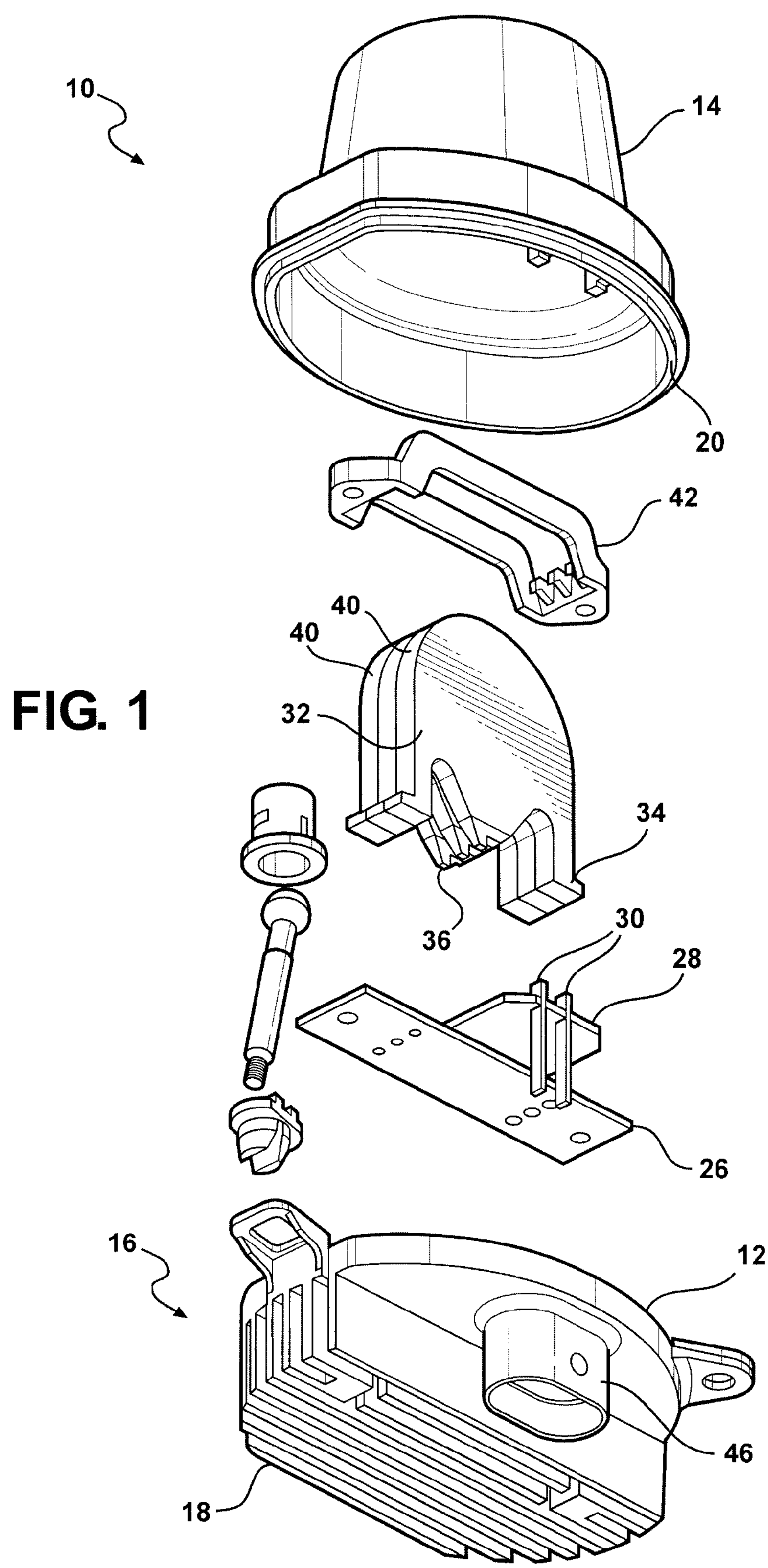
FIG. 1 shows an exploded perspective view of the back and side of a light fixture in accordance with the present invention.
Figure 2:
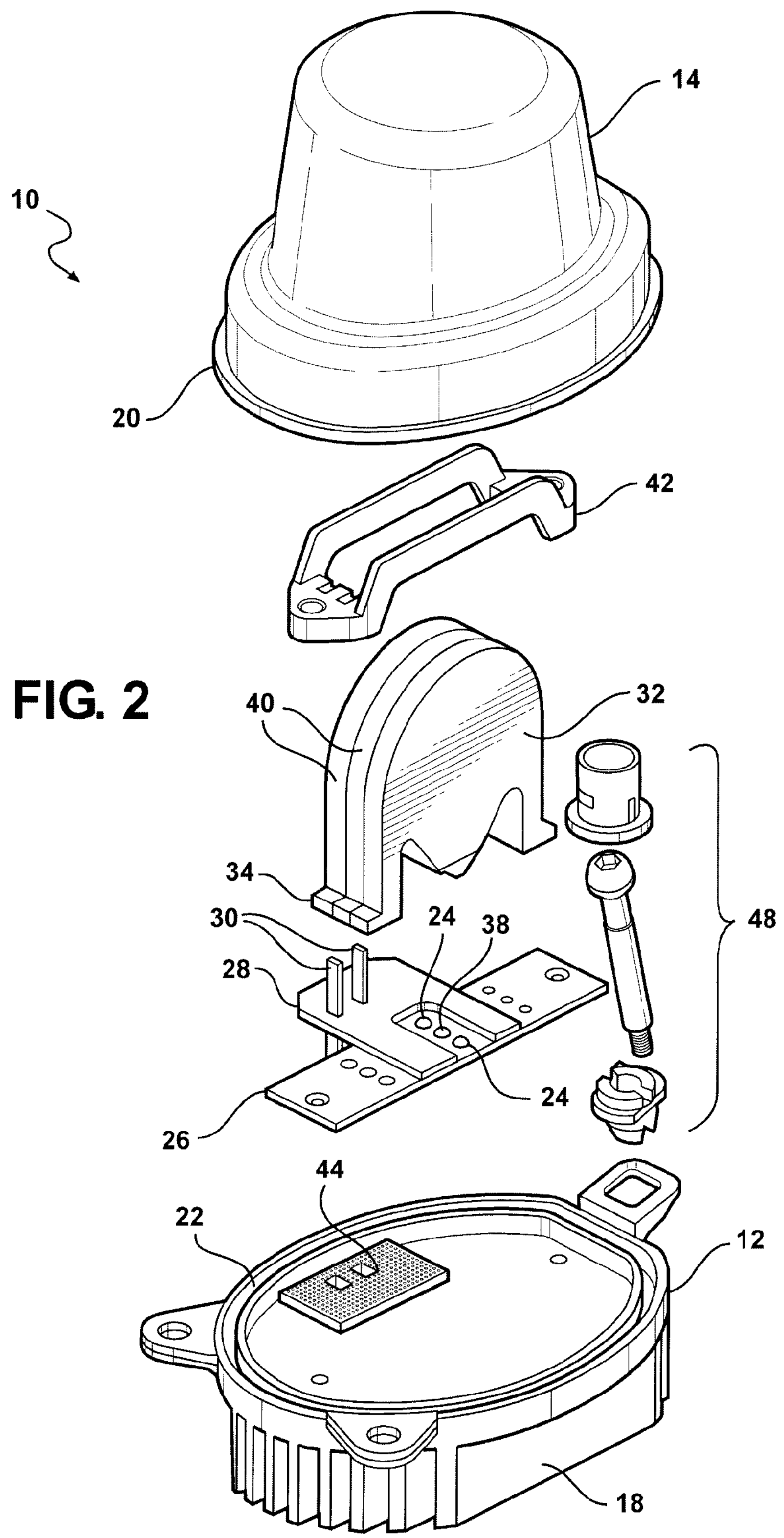
FIG. 2 shows an exploded perspective view of the front and side of the fixture of FIG. 1.

A vehicular lighting fixture in accordance with the present invention is indicated generally at 10 in FIGS. 1 and 2. In the illustrated embodiment, lighting fixture 10 is a fog lamp which can be optionally activated by a driver in conditions of fog, mist, dust or the like to provide additional low level illumination of a road surface. However, as will be apparent to those of skill in the art, the present invention is not limited to use with fog lamps and can instead be employed in a wide range of vehicular lighting system fixtures, including driving lights, daytime running lights or other vehicular fixtures producing desired illumination patterns.

Fixture 10 has a base member 12 and a lens 14 which form a waterproof enclosure for the electronic components, described below, and other components of fixture 10.

The base member 12 includes a heat sink, generally shown at 16, which includes a series of cooling fins 18 which are used to remove waste heat from the interior of fixture 10 as described below. In a presently preferred embodiment of the invention, the base member 12 is fabricated from die cast aluminum or zinc alloys, and cooling fins 18 are integrally formed as part of base member 12. However, the present invention is not so limited and it is contemplated that the base member 12 may include a portion, or portions, formed of a suitable plastic material joined with a separately formed set of cooling fins 18 which can be thermally connected to the interior of the fixture 10.

The lens 14 is formed of any suitable material such as polycarbonate or acrylic and can be transparent or colored, as desired. As shown in the Figures, the lens 14 includes a peripheral lip 20 which is received in, and affixed to with a suitable adhesive, a complementary channel 22 (best seen in FIG. 2) in base member 12 to form the enclosure of the fixture 10.

In the embodiment of the fixture 10 as illustrated in the Figures, three semiconductor light sources 24 are employed to produce the desired light. As will be apparent to those of skill in the art, the present invention is not limited to using three semiconductor light sources 24 and fewer or more semiconductor light sources can be employed as required to form the desired light pattern produced by fixture 10. For example, it is contemplated that if fixture 10 is to be employed as a daytime running light, fixture 10 can only employ a single semiconductor light source 24. Similarly, if fixture 10 is to be employed as a driving lamp, or if lens 14 is tinted, four or more semiconductor light sources 24 can be employed.

The semiconductor light sources 24 are thermally connected to a thermal substrate 26 which may be any suitable substrate that can transfer heat away from semiconductor light sources 24 when they are operating. In a present embodiment, the substrate 26 includes a layer of fiberglass reinforced plastic atop a layer of copper. The layer of fiberglass reinforced plastic is removed from substrate 26 where the semiconductor light sources 24 are mounted, such that the semiconductor light sources 24 are mounted in thermal connection to the exposed layer of cooper. In this manner, waste heat produced in semiconductor light sources 24 is readily transferred to the copper layer of the substrate 26.

An electrical circuit board 28 is mounted to the substrate 26 adjacent to the semiconductor light sources 24. The circuit board 28 includes suitable power supply control circuitry to regulate and supply power to the semiconductor light sources 24, which are electrically connected to the circuit board 28. The power supply control circuitry employed is not particularly limited and any suitable circuitry, as will occur to those of skill in the art, can be employed.

The circuit board 28 further includes a set of electrical power input connectors 30, which receive electrical power from the vehicle in which fixture 10 is installed; that electrical power is regulated and supplied to the semiconductor light sources 24 by the circuitry on the circuit board 28.

As mentioned above, one of the challenges in using semiconductor light sources in vehicular applications is ensuring that the light they produce is used efficiently to form the desired light pattern. With regard to the fixture 10, each semiconductor light source 24 is paired with a respective optical body 32, which gathers the light emitted from the corresponding semiconductor light source 24 and outputs that light as a portion of the desired light pattern. As mentioned above, while the illustrated embodiment employs three semiconductor light sources 24, and thus employs three optical bodies 32, the present invention is not so limited and more or fewer semiconductor light sources 24 can be employed with a corresponding number of optical bodies 32.

In the illustrated embodiment, the specific implementation of the optical body 32 is similar to that described in PCT Application Serial No. CA 08/000139, claiming priority from U.S. Provisional Patent Application 60/897,352 filed Jan. 25, 2007 and assigned to the assignee of the present invention. The contents of these previous applications are incorporated herein, in their entirety, by reference. While it is presently preferred that the optical body 32 correspond to the design disclosed in the Ser. No. 60/897,352 application, the present invention is not so limited and any other suitable means for efficiently gathering and directing the light from the semiconductor light sources 24 can be employed as will occur to those of skill in the art.

Each optical body 32 has a general "D"-shape and includes a pair of mounting legs 34 which are used to mount the optical body 32 to the substrate 26. Each optical body 32 is mounted to the substrate 26 such that the light receiving surface 68 of each optical body 32 is located immediately adjacent to the upper (light emitting) surface 38 of the semiconductor light source 24 such that substantially all of the light emitted from each semiconductor light source 24 enters each respective optical body 32. In some embodiments, the light receiving surface is positioned at a distance from the light emitting surface that ensure rays of light enter the light receiving surface at an angle of no more than forty-five degrees, thus ensuring that all of the received light experiences total internal refraction with the optical body.

The light which enters the optical body 32 then travels through the optical body 32 by total internal reflection until it exits the light output surface 40 of the optical body 32. By selecting the appropriate geometry for the light output surface 40 (i.e. —curvature, thickness, the flat spots, etc.) and any desired thickness or cross section shape changes along the optical body 32 (as described in the above-mentioned PCT Application Serial No. CA 08/000139, basing priority on U.S. Provisional Patent Application 60/897,352), the resulting light pattern produced by fixture 10 can be created as desired.

A retaining member 42, which may be formed of a suitable plastic material or metal, is fastened to the substrate 26 (surrounding the optical bodies 32) and to the base member 12 such that the copper layer of the substrate 26 is in thermal contact with the base member 12, and the substrate 26 and optical bodies 32 are maintained in a predefined position within the enclosure of the fixture 10.

When the substrate 26 is fastened in a predefined position, the electrical power input connectors 30 extend through an elastomeric sealing member 44 to a wiring harness connector receptacle 46 formed in the base member 12. The receptacle 46 can receive a wiring harness connector to provide electrical power to the circuit board 28 via electrical power input connectors 30.

The fixture 10 preferably further includes at least one adjustment mechanism 48 which interfaces with base member 12 to allow the mounting position of fixture 10 in a vehicle to be altered to aim the output light pattern from fixture 10 as desired.

As should now be apparent, when semiconductor light sources 24 are operating, the waste heat they produce is transferred, first, to substrate 26 and then to base member 12 which is in thermal contact with the copper layer of substrate 26. The waste heat is then radiated/rejected from base member 12 by cooling fins 18.

Fixture 10 provides a number of advantages in that it provides for appropriate cooling of semiconductor light sources 24 without incurring undue manufacturing costs. The use of the optical bodies 32 provides for the efficient utilization of the light emitted by the semiconductor light sources 24 and the formation of desired light patterns output by the fixture 10, all with a relatively overall size and volume required for fixture 10. In fact, it is contemplated that fixture 10 can be manufactured in a sufficiently small volume that it can be retrofitted to existing vehicles to replace existing incandescent fixtures.

The present invention provides a compact yet efficient light fixture employing semiconductor light sources to produce output light in desired patterns. The fixture can be used to produce fog lamps, driving lamps and other non-headlamp vehicle lighting functions. Depending upon the light output required, one or more semiconductor light sources and a corresponding number of optical bodies are employed to produce the desired light pattern.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A vehicular lighting fixture for producing light in a desired pattern, comprising:

a base member;

a substrate mounted to said base member, said substrate being in thermal communication with said base member;

at least one semiconductor light source mounted to said substrate, said at least one semiconductor light source being in thermal communication with said substrate; and at least one optical body mounted on said substrate and being operable for receiving light from said at least one semiconductor light source for producing a desired beam pattern, the optical body formed by two opposing side surfaces and a peripheral surface coupling edges of the two side surfaces to each other, the two opposing side surfaces having a general D-shape profile with a light receiving area formed by a portion of the peripheral surface along flat side of the D-shape profile and a light output area formed by a portion of the peripheral surface adjacent to curved side of the D-shape profile having a general D-shape profile with a flat surface of the D-shape serving as a light receiving surface, a curved surface of the D-shape serving a light output surface and two opposing side surfaces, wherein a dimension measured between the two opposing side surfaces increases with distance from the light receiving area surface to the light output area surface and is positioned at a distance from the light emitting surface that ensures rays of light enter the light receiving surface at an angle of no more than forty-five degrees.

2. The vehicular lighting fixture for producing light in a desired pattern of claim 1, said at least one semiconductor light source further comprising a light emitting diode operable for emitting light from said at least one semiconductor light source.

3. The vehicular lighting fixture for producing light in a desired pattern of claim 1, said at least one optical body further comprising at least one mounting leg for mounting said at least one optical body to said substrate.

4. The vehicular lighting fixture for producing light in a desired pattern of claim 1, said at least one semiconductor light source further comprising a plurality of semiconductor light sources, and said at least one optical body further comprising a plurality of optical bodies, each one of said plurality of optical bodies being operable for receiving light from one of said plurality of semiconductor light sources.

5. The vehicular lighting fixture for producing light in a desired pattern of claim 1, further comprising a set of cooling fins in thermal communication with said base member, said set of cooling fins being operable for removing heat from said base member.

6. The vehicular lighting fixture for producing light in a desired pattern of claim 1, further comprising an electrical circuit board operable for providing a power supply to said at least one semiconductor light source.

7. The vehicular lighting fixture for producing light in a desired pattern of claim 6, said electrical circuit board further comprising:

power regulation circuitry operable for delivering power to said at least one semiconductor light source; and a set of electrical input connectors extending away from said electrical circuit board for receiving electrical power.

8. The vehicular lighting fixture for producing light in a desired pattern of claim 7, said base member further comprising:

an elastomeric sealing member; and a wiring harness connector receptacle formed as part of said base member, wherein said set of electrical input connectors extend through said elastomeric sealing member to said wiring harness connector receptacle.

9. The vehicular lighting fixture for producing light in a desired pattern of claim 1, further comprising:

a lens having a peripheral lip; and a complementary channel formed on said base member, said peripheral lip being received in said complementary channel such that a waterproof enclosure is formed between said lens and said base member.

10. A vehicular lighting fixture for producing light in a desired pattern, comprising:

a base member operable for being mounted to a vehicle;

a substrate mounted to said base member, said substrate being in thermal communication with said base member;

at least one semiconductor light source having a light emitting surface, said at least one semiconductor light source being mounted to and in thermal communication with said substrate;

at least one optical body mounted on said substrate, the optical body having a general D-shape profile with a flat surface of the D-shape serving as a light receiving surface, a curved surface of the D-shape serving a light output surface and two opposing side surfaces, such that a dimension measured between the two opposing side surfaces increases with distance from the light receiving surface to the light output surface, wherein the light receiving surface is configured to receive light from the light emitting surface and is positioned at a distance from the light emitting surface that ensures rays of light enter the light receiving surface at an angle of no more than forty-five degrees; and a lens being operable for connection with said base member such that light emitted from said at least one optical body travels through said lens.

11. The vehicular lighting fixture for producing light in a desired pattern of claim 10, said at least one semiconductor light source further comprising a plurality of semiconductor light sources, and said at least one optical body further comprising a plurality of optical bodies, each one of said plurality of optical bodies being operable for receiving light from one of said plurality of semiconductor light sources.

12. The vehicular lighting fixture for producing light in a desired pattern of claim 10, further comprising at least one mounting leg formed as part of said at least one optical body for connecting said at least one optical body to said substrate.

13. The vehicular lighting fixture for producing light in a desired pattern of claim 10, further comprising:

a peripheral lip formed as part of said lens; and a complementary channel formed as part of said base member such that said peripheral lip is operable for being received into said complementary channel to form a waterproof enclosure between said lens and said base member.

14. The vehicular lighting fixture for producing light in a desired pattern of claim 10, further comprising a set of cooling fins integrally formed as part of said base member, said set of cooling fins being operable for removing waste heat from said base member.

15. The vehicular lighting fixture for producing light in a desired pattern of claim 10, further comprising:

an electrical circuit board having power regulation circuitry operable for providing power to said at least one semiconductor light source;

a set of electrical input connectors mounted on and extending away from said electrical circuit board;

an elastomeric sealing member mounted on said base member; and a wiring harness connector receptacle formed as part of said base member, wherein said set of electrical input connectors extend through said elastomeric sealing member to said wiring harness connector receptacle.

16. A vehicular lighting fixture for producing light in a desired pattern, comprising:

a base member operable for being mounted to a vehicle;

a substrate mounted to said base member, said substrate being in thermal communication with said base member;

a plurality of semiconductor light sources, each of said plurality of semiconductor light sources having a light emitting surface, said plurality of semiconductor light sources being mounted to and in thermal communication with said substrate;

a plurality of optical bodies, each one of said plurality of optical bodies being operable for receiving light from one of said plurality of semiconductor light sources, each of said plurality of optical bodies being of a general D-shape with a flat surface of the D-shape serving as a light receiving surface, a curved surface of the D-shape serving a light output surface and two opposing side surfaces, wherein a dimension measured between the two opposing side surfaces increases with distance from the light receiving surface to the light output and is positioned at a distance from the light emitting surface that ensures rays of light enter the light receiving surface at an angle of no more than forty-five degrees;

a plurality of cooling fins formed as part of said base member, said plurality of cooling fins being operable for transferring waste heat away from said substrate and said base member; and a lens being operable for connection with said base member such that light emitted from the plurality of optical bodies travels through said lens.

17. The vehicular lighting fixture for producing light in a desired pattern of claim 16, further comprising at least one mounting leg formed as part of said at least one optical body, said at least one mounting leg operable for connecting said at least one optical body to said substrate.

18. The vehicular lighting fixture for producing light in a desired pattern of claim 16, further comprising:

an electrical circuit board having power regulation circuitry for providing power to said plurality of semiconductor light sources;

a set of electrical input connectors extending away from said electrical circuit board for receiving electrical power;

an elastomeric sealing member operable for being mounting on said base member; and a wiring harness connector receptacle formed as part of said base member, wherein said set of electrical input connectors extend through said elastomeric sealing member to said wiring harness connector receptacle.

19. The vehicular lighting fixture for producing light in a desired pattern of claim 16, further comprising:

a peripheral lip integrally formed as part of said lens; and a complementary channel formed on said base member, wherein said peripheral lip of said lens is operable for being received into said complementary channel such that a waterproof enclosure is formed between said lens and said base member.

20. The vehicular lighting fixture for producing light in a desired pattern of claim 10 wherein the two side surfaces are curved inward toward each other.

* * * * *